United States Patent
Tsuchiya et al.

(10) Patent No.: US 10,125,240 B2
(45) Date of Patent: Nov. 13, 2018

(54) LIQUID CRYSTAL POLYMER COMPOSITION

(71) Applicant: UENO FINE CHEMICALS INDUSTRY, LTD., Osaka-shi, Osaka (JP)

(72) Inventors: Hitoshi Tsuchiya, Sanda (JP); Masahiro Kihara, Sanda (JP); Masahiro Fukazawa, Sanda (JP)

(73) Assignee: UENO FINE CHEMICALS INDUSTRY, LTD., Osaka-shi (JP)

( * ) Notice: Subject to any disclaimer, the term of this patent is extended or adjusted under 35 U.S.C. 154(b) by 0 days.

(21) Appl. No.: 15/464,753

(22) Filed: Mar. 21, 2017

(65) Prior Publication Data
US 2017/0283586 A1 Oct. 5, 2017

(30) Foreign Application Priority Data

Mar. 29, 2016 (JP) ................. 2016-065386

(51) Int. Cl.
| | | |
|---|---|---|
| C08K 3/34 | (2006.01) |
| C08K 5/3492 | (2006.01) |
| C08G 63/06 | (2006.01) |
| C08K 7/14 | (2006.01) |
| C09K 19/38 | (2006.01) |
| C09K 19/54 | (2006.01) |
| C09K 19/52 | (2006.01) |

(52) U.S. Cl.
CPC ........ *C08K 5/34924* (2013.01); *C08G 63/065* (2013.01); *C08K 3/34* (2013.01); *C08K 7/14* (2013.01); *C09K 19/3809* (2013.01); *C09K 19/54* (2013.01); *C09K 2019/521* (2013.01); *C09K 2019/523* (2013.01)

(58) Field of Classification Search
CPC ........ C08K 5/34924; C08K 3/34; C08K 7/14; C08G 63/065
See application file for complete search history.

(56) References Cited

U.S. PATENT DOCUMENTS

| | | | |
|---|---|---|---|
| 4,904,752 A | 2/1990 | Kanoe et al. | |
| 5,352,746 A | 10/1994 | Asai et al. | |
| 5,766,507 A | 6/1998 | Nakai | |
| 8,696,932 B2* | 4/2014 | Uchida | C09K 19/3809 252/299.01 |
| 9,850,343 B2* | 12/2017 | Konishi | C08G 63/605 |
| 2005/0209378 A1* | 9/2005 | Ahsan | C08G 59/08 524/100 |
| 2013/0026413 A1 | 1/2013 | Uchida et al. | |

FOREIGN PATENT DOCUMENTS

| | | |
|---|---|---|
| JP | 2-173156 A | 7/1990 |
| JP | 03-95260 A | 4/1991 |
| JP | 06-32880 A | 2/1994 |
| JP | 2000-309636 A | 11/2000 |

OTHER PUBLICATIONS

Communication dated Sep. 18, 2017 from the European Patent Office in counterpart application No. 17161838.2.
Matzen et al., "Influence of Flame Retardants on the Melt Dripping Behaviour of Thermoplastic Polymers," Materials (Aug. 27, 2015) vol. 8, No. 9, pp. 5621-5646.

* cited by examiner

*Primary Examiner* — Hannah J Pak
(74) *Attorney, Agent, or Firm* — Sughrue Mion, PLLC

(57) ABSTRACT

To provide a liquid crystal polymer composition whose fluidity during molding is improved without degrading the mechanical properties thereof. A liquid crystal polymer composition which contains 100 parts by weight of a liquid crystal polymer, 1 to 200 parts by weight of an inorganic filler and/or an organic filler, and 0.01 to 2 parts by weight of a melamine compound as a flow modifier.

13 Claims, No Drawings

LIQUID CRYSTAL POLYMER COMPOSITION

FIELD OF THE INVENTION

The present invention relates to a liquid crystal polymer composition which is excellent in the fluidity during molding.

BACKGROUND ART

Use of a thermotropic liquid crystal polymer is expanding for various uses because the liquid crystal polymer is excellent in the mechanical properties such as the heat resistance and the rigidity, the chemical resistance, the dimension precision, and the like. Hereinafter, a thermotropic liquid crystal polymer will be referred to as a liquid crystal polymer or LCP.

Especially, as to devices in the fields of information and communication such as a personal computer and a mobile phone, an increase of the integration density, downsizing, a reduction of the thickness and a reduction of the height of their parts are rapidly advanced, and a very thin portion may often be formed in the parts. The use amount of a liquid crystal polymer has therefore significantly increased utilizing the features of a liquid crystal polymer which are not found in other resins such as the excellent moldability, that is, the satisfying fluidity and the avoidance of any burr.

However, the reduction of the thickness, and complication in the shapes of the electronic parts used in the information and the communication fields are advanced day by day. Accordingly, further improvement of the fluidity during molding is demanded to a liquid crystal polymer.

Many methods of improving the fluidity of a liquid crystal polymer during molding are known. For example, Patent Document 1 discloses a method of additionally blending a liquid crystal polymer having a specific molecular weight. Patent Document 2 discloses a method of including in a liquid crystal polymer an oligomer of 4-hydroxybenzoic acid exhibiting a specific flow temperature. Patent Document 3 discloses a method of producing a liquid crystal polymer by the deacetation melt polymerization in which a polymerization reaction liquid is supplied to a vertical stirring thin-film evaporator and is passed therethrough to reduce the amount of an acetic acid generated in the resulting liquid crystal polymer; and a liquid crystal polymer excellent in the fluidity is thereby acquired. Patent Document 4 discloses a method of adding a phosphoric acid-based compound during the production of a liquid crystal polymer.

However, the methods disclosed in Patent Document 1 and Patent Document 2 have a problem that a liquid crystal polymer having a specific molecular weight and an oligomer of 4-hydroxybenzoic acid exhibiting a specific flow temperature are not easily produced. The method disclosed in Patent Document 3 has a problem that a special apparatus such as a vertical stirring thin-film evaporator has to be used. The method disclosed in Patent Document 4 has a problem that the mechanical properties of a liquid crystal polymer may significantly be degraded depending on the type and the use amount of a phosphoric acid-based compound.

Because of the above, there is a need for a liquid crystal polymer in which the fluidity during molding is improved without the deterioration of mechanical properties of the liquid crystal polymer using inexpensive and easily available materials and employing no special apparatus.

Patent Document 1: Japanese Patent Publication No. 2-173156
Patent Document 2: Japanese Patent Publication No. 3-095260
Patent Document 3: Japanese Patent Publication No. 2000-309636
Patent Document 4: Japanese Patent Publication No. 06-032880

SUMMARY OF THE INVENTION

An object of the invention is to provide a liquid crystal polymer composition in which the fluidity during molding is improved without the deterioration of mechanical properties.

The inventors actively studied the improvement of the fluidity during molding of a liquid crystal polymer. As a result, the inventors found that a melamine compound serves as a flow modifier by the inclusion of a small amount of a melamine compound together with an inorganic filler and/or an organic filler in a liquid crystal polymer and that the fluidity during molding is improved without the deterioration of mechanical properties. The inventors thereby completed the invention.

The invention provides a liquid crystal polymer composition which includes 100 parts by weight of a liquid crystal polymer, 1 to 200 parts by weight of an inorganic filler and/or an organic filler, and 0.01 to 2 parts by weight of a melamine compound as a flow modifier.

EFFECT OF THE INVENTION

A liquid crystal polymer composition of the invention does not deteriorate in the mechanical properties and is excellent in the fluidity. Accordingly, a liquid crystal polymer composition of the invention may be advantageously used as a molding resin to which downsizing and reduction of the thickness are demanded.

EMBODIMENTS OF THE INVENTION

A liquid crystal polymer used in a liquid crystal polymer composition of the invention is a polyester or a polyester amide forming an anisotropic molten phase, and is not especially limited as long as it is referred to as a thermotropic liquid crystal polyester or a thermotropic liquid crystal polyester amide in the technical field.

The properties of an anisotropic melt phase may be confirmed by a conventional polarization inspection method utilizing crossed polarizers. More specifically, the confirmation of an anisotropic melt phase may be carried out by observing a sample placed on the Leitz hot stage at a magnification of 40 times in a nitrogen atmosphere using a Leitz polarization microscope. A liquid crystal polymer of the invention is optically anisotropic. That is, a liquid crystal polymer of the invention transmits light when the liquid crystal polymer is examined between crossed polarizers. If a sample is optically anisotropic, the sample transmits polarized light even in a stationary state.

Examples of a polymerizable monomer which constitutes a liquid crystal polymer of the invention include, for example, an aromatic hydroxycarboxylic acid, an aromatic dicarboxylic acid, an aromatic diol, an aromatic aminocarboxylic acid, an aromatic hydroxyamine, an aromatic diamine, an aliphatic diol, and an aliphatic dicarboxylic acid. One of the above-mentioned compounds may be used alone, or two or more thereof may be used in combination as a polymerizable monomer constituting a liquid crystal polymer while the inclusion of at least one polymerizable monomer having a hydroxy group and a carboxylic group is preferred.

A polymerizable monomer constituting a liquid crystal polymer may be an oligomer obtained by bonding one or more of the above-mentioned compounds, that is, an oligomer composed of one or more of the above-mentioned compounds.

Examples of the aromatic hydroxycarboxylic acid include, for example, 4-hydroxybenzoic acid, 3-hydroxybenzoic acid, 2-hydroxybenzoic acid, 6-hydroxy-2-naphthoic acid, 5-hydroxy-2-naphthoic acid, 7-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and an alkyl-, alkoxy-, or halogen-substituted product thereof, as well as an ester-forming derivative such as an acylated product, an ester derivative and an acid halide of the above-mentioned compounds. Among these, one or more compounds selected from the group consisting of 4-hydroxybenzoic acid and 6-hydroxy-2-naphthoic acid are preferably used from the viewpoint that the heat resistance, the mechanical strength, and the melting point of the resulting liquid crystal polymer may easily be adjusted.

Examples of the aromatic dicarboxylic acid include, for example, terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, and 4,4''-dicarboxyterphenyl and an alkyl-, alkoxy-, or halogen-substituted product thereof, as well as an ester-forming derivative such as an ester derivative and an acid halide of the above-mentioned compounds. Among these, from the viewpoint that the heat resistance of the resulting liquid crystal polymer may be effectively enhanced, one or more compounds selected from the group consisting of terephthalic acid, isophthalic acid and 2,6-naphthalenedicarboxylic acid are preferably used, and terephthalic acid and/or 2,6-naphthalenedicarboxylic acid are/is more preferably used.

Examples of the aromatic diol include, for example, hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenyl ether, and 2,2'-dihydroxybinaphthyl and an alkyl-, alkoxy-, or halogen-substituted product thereof, as well as an ester-forming derivative such as an acylated product of the above-mentioned compounds. Among these, from the viewpoint that the reactivity during polymerization is excellent, one or more compounds selected from the group consisting of hydroquinone, resorcin, 4,4'-dihydroxybiphenyl and 2,6-dihydroxynaphthalene are preferably used, and one or more compounds selected from the group consisting of hydroquinone, 4,4'-dihydroxybiphenyl and 2,6-dihydroxynaphthalene are more preferably used.

Examples of the aromatic aminocarboxylic acid include, for example, 4-aminobenzoic acid, 3-aminobenzoic acid and 6-amino-2-naphthoic acid and an alkyl-, alkoxy-, or halogen-substituted product thereof, as well as an ester-forming derivative such as an acylated product, an ester derivative and an acid halide of the above-mentioned compounds.

Examples of the aromatic hydroxyamine include, for example, 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenylmethane, 4-amino-4'-hydroxybiphenylsulfide, 2,2'-diaminobinaphthyl and an alkyl-, alkoxy-, or halogen-substituted product thereof, as well as an ester-forming derivative such as an acylated product of the above-mentioned compounds. Among these, 4-aminophenol is preferably used from the viewpoint that the balance may easily be established between the heat resistance and the mechanical strength of the resulting liquid crystal polymer.

Examples of the aromatic diamine include, for example, 1,4-phenylenediamine, 1,3-phenylenediamine, 1,5-diaminonaphthalene, 1,8-diaminonaphthalene and an alkyl-, alkoxy-, or halogen-substituted product thereof, as well as an amide-forming derivative such as an acylated product of the above-mentioned compounds.

Examples of the aliphatic diol include, for example, ethylene glycol, 1,4-butanediol, 1,6-hexanediol, and an acylated product thereof. A polymer including an aliphatic diol such as polyethylene terephthalate or polybutylene terephthalate may be reacted with the aromatic hydroxycarboxylic acid, the aromatic dicarboxylic acid and the aromatic diol described above, as well as an acylated product, an ester derivative and an acid halide of the above-mentioned compounds.

Examples of the aliphatic dicarboxylic acid include, for example, oxalic acid, malonic acid, succinic acid, glutaric acid, adipic acid, pimelic acid, suberic acid, azelaic acid, sebacic acid, dodecanedioic acid, tetradecanedioic acid, fumaric acid, maleic acid, and hexahydroterephthalic acid. Among these, oxalic acid, succinic acid, adipic acid, suberic acid, sebacic acid, and dodecanedioic acid are preferably used from the viewpoint that the reactivity during polymerization is excellent.

In the invention, a liquid crystal polymer may be a liquid crystal polymer which includes dihydroxyterephthalic acid, 4-hydroxyisophthalic acid, 5-hydroxyisophthalic acid, trimellitic acid, 1,3,5-benzenetricarboxylic acid, pyromellitic acid or an alkyl-, alkoxy-, or halogen-substituted product thereof, as well as an ester-forming derivative such as an acylated product, an ester derivative and an acid halide of the above-mentioned compounds as a polymerizable monomer within such a range that the purpose of the invention is not impaired. Preferably, the use amount of such a polymerizable monomer is equal to or smaller than 10% by mol relative to the total amount of other polymerizable monomers.

In the invention, a liquid crystal polymer may be a liquid crystal polymer which includes a thioester bond within such a range that the purpose of the invention is not impaired. Examples of the polymerizable monomer providing a thioester bond include mercapto-aromatic carboxylic acid, aromatic dithiol, hydroxy-aromatic thiol, and the like. Preferably, the content of such a polymerizable monomer is equal to or smaller than 10% by mol relative to the total amount of other polymerizable monomers.

A polymer formed by combining these repeating units exist as a polymer forming an anisotropic molten phase or a polymer forming no anisotropic molten phase depending on the structure of a monomer, the composition ratio thereof and the sequence distribution of each repeating unit in the polymer, while a liquid crystal polymer used in the invention is limited to a polymer forming an anisotropic molten phase.

As a polymer used in a liquid crystal polymer composition of the invention, a liquid crystal polyester resin containing repeating units represented by formulae (I) and (II) is preferably used since such a liquid crystal polyester resin is excellent in the fluidity and the mechanical properties.

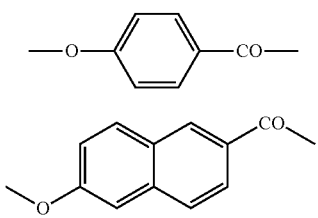

(I)

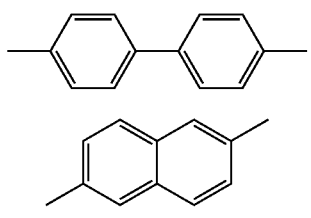

(3)

(II)

(4)

As a liquid crystal polymer used in a liquid crystal polymer composition of the invention, a wholly aromatic liquid crystal polyester resin composed of the repeating units represented by formulae (I) and (II) is preferably used since such a wholly aromatic liquid crystal polyester resin is excellent in the fluidity and the mechanical properties.

Furthermore, as a liquid crystal polymer used in a liquid crystal polymer composition of the invention, a wholly aromatic liquid crystal polyester resin composed of the repeating units represented by formulae (I) to (IV) is preferably used since such a wholly aromatic liquid crystal polyester resin is excellent in the fluidity and the mechanical properties:

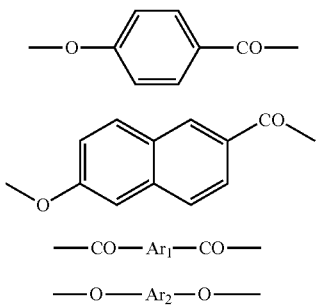

(I)

(II)

(III) —CO—$Ar_1$—CO—

(IV) —O—$Ar_2$—O— wherein, $Ar_1$ and $Ar_2$ each represent a divalent aromatic group.

The formulae (III) and (IV) may include plural types of $Ar_1$ and plural types of $Ar_2$. The "aromatic group" refers to an aromatic group which is a six-membered single ring or a condensed ring having two rings.

More preferably, $Ar_1$ and $Ar_2$ are one or more selected independently from each other, from the group consisting of aromatic groups represented by the following formulae (1) to (4) since the excellent fluidity and the excellent mechanical properties are achieved. Especially preferably, $Ar_1$ is an aromatic group represented by the formulae (1) and/or (4), and $Ar_2$ is an aromatic group represented by the formulae (1) and/or (3).

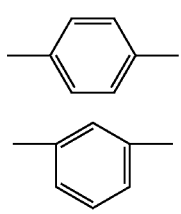

(1)

(2)

A liquid crystal polymer used in a liquid crystal polymer composition of the invention may be a mixture of a wholly aromatic liquid crystal polyester resin which includes the repeating units represented by the formulae (I) and (II) and a wholly aromatic liquid crystal polyester resin which includes the repeating units represented by the formulae (I) to (IV). Such a mixture is preferably used from the viewpoint that the fluidity and the heat resistance are improved.

Examples of the combination of polymerizable monomers constituting a liquid crystal polymer used in a liquid crystal polymer composition of the invention include, for example, those listed below.

1) 4-hydroxybenzoic acid/6-hydroxy-2-naphthoic acid,
2) 4-hydroxybenzoic acid/terephthalic acid/4,4'-dihydroxybiphenyl,
3) 4-hydroxybenzoic acid/terephthalic acid/isophthalic acid/4,4'-dihydroxybiphenyl,
4) 4-hydroxybenzoic acid/terephthalic acid/isophthalic acid/4,4'-dihydroxybiphenyl/hydroquinone,
5) 4-hydroxybenzoic acid/terephthalic acid/hydroquinone,
6) 6-hydroxy-2-naphthoic acid/terephthalic acid/hydroquinone,
7) 4-hydroxybenzoic acid/6-hydroxy-2-naphthoic acid/terephthalic acid/4,4'-dihydroxybiphenyl,
8) 6-hydroxy-2-naphthoic acid/terephthalic acid/4,4'-dihydroxybiphenyl,
9) 4-hydroxybenzoic acid/6-hydroxy-2-naphthoic acid/terephthalic acid/hydroquinone,
10) 4-hydroxybenzoic acid/6-hydroxy-2-naphthoic acid/terephthalic acid/hydroquinone/4,4'-dihydroxybiphenyl,
11) 4-hydroxybenzoic acid/2,6-naphthalenedicarboxylic acid/4,4'-dihydroxybiphenyl,
12) 4-hydroxybenzoic acid/terephthalic acid/2,6-naphthalenedicarboxylic acid/hydroquinone,
13) 4-hydroxybenzoic acid/2,6-naphthalenedicarboxylic acid/hydroquinone,
14) 4-hydroxybenzoic acid/6-hydroxy-2-naphthoic acid/2,6-naphthalenedicarboxylic acid/hydroquinone,
15) 4-hydroxybenzoic acid/terephthalic acid/2,6-naphthalenedicarboxylic acid/hydroquinone/4,4'-dihydroxybiphenyl,
16) 4-hydroxybenzoic acid/terephthalic acid/4-aminophenol,
17) 6-hydroxy-2-naphthoic acid/terephthalic acid/4-aminophenol,
18) 4-hydroxybenzoic acid/6-hydroxy-2-naphthoic acid/terephthalic acid/4-aminophenol,
19) 4-hydroxybenzoic acid/terephthalic acid/4,4'-dihydroxybiphenyl/4-aminophenol,
20) 4-hydroxybenzoic acid/terephthalic acid/ethylene glycol,
21) 4-hydroxybenzoic acid/terephthalic acid/4,4'-dihydroxybiphenyl/ethylene glycol,
22) 4-hydroxybenzoic acid/6-hydroxy-2-naphthoic acid/terephthalic acid/ethylene glycol, 23) 4-hydroxybenzoic acid/6-hydroxy-2-naphthoic acid/terephthalic acid/4,4'-dihydroxybiphenyl/ethylene glycol, and
24) 4-hydroxybenzoic acid/terephthalic acid/2,6-naphthalenedicarboxylic acid/4,4'-dihydroxybiphenyl.

Among these, the liquid crystal polymers composed of the constituent units of the polymerizable monomers of 1), 10) and 14) are preferred.

Any one of the above-mentioned liquid crystal polymers may be used alone, or two or more thereof may be used as a mixture.

A production process of a liquid crystal polymer used in the invention will be described.

The production process of a liquid crystal polymer used in the invention is not especially limited, and a liquid crystal polymer may be obtained by providing polymerizable monomers to a publicly known polycondensation method for forming an ester bond or an amide bond such as a melt acidolysis method and a slurry polymerization method.

The melt acidolysis method is a preferred method to produce a liquid crystal polymer used in a liquid crystal polymer composition of the invention. According to this method, a polymerizable monomer is firstly heated to form a melt solution of a reacting substance, and subsequently, the polycondensation reaction is continuously conducted to obtain a melt polymer. A vacuum may be applied to facilitate removal of volatile substances (for example, acetic acid and water) which are sub-generated in the final stage of the condensation.

The slurry polymerization method is a method of reacting the polymerizable monomer in the presence of a heat exchanging fluid, and a solid product is obtained in the form of a suspension in which the solid product is suspended in a heat exchanging medium.

In the melt acidolysis method and/or the slurry polymerization method, a polymerizable monomer used in the production of a liquid crystal polymer may also be provided to the reaction as a modified form obtained by the acylation of a hydroxyl group and/or an amino group at the normal temperature, that is, as a lower acylated product.

A lower acyl group having 2 to 5 carbon atoms is preferably used, and a lower acyl group having 2 or 3 carbon atoms is more preferably used. In a preferred embodiment of the invention, an acylated product of the above-mentioned polymerizable monomer is used in the reaction.

A lower acylated product of the polymerizable monomer may be a lower acylated product which is synthesized in advance by separate acylation or may be produced in a reaction system by adding an acylating agent such as acetic anhydride to a polymerizable monomer when a liquid crystal polymer is produced.

In the melt acidolysis method and/or the slurry polymerization method, the polycondensation reaction may be conducted at a temperature of 150 to 400° C., preferably, of 250 to 370° C. at a normal pressure and/or a reduced pressure, and a catalyst may be used therein if necessary.

Examples of the catalyst include, for example, an organic tin compound such as a dialkyltin oxide (for example, dibutyltin oxide) and a diaryltin oxide; a titanium dioxide; an antimony trioxide; an organic titanium compound such as an alkoxytitanium silicate and a titanium alkoxide; an alkali metal salt and an alkaline-earth metal salt of a carboxylic acid (for example, a potassium acetate); and a gaseous acid catalyst such as a Lewis acid (for example, a boron trifluoride) and a hydrogen halide (for example, hydrogen chloride).

When a catalyst is used, the amount of the catalyst is preferably 1 to 1000 ppm, more preferably 2 to 100 ppm, relative to the total amount of polymerizable monomers.

A liquid crystal polymer obtained by conducting the polycondensation as described above is usually removed in the molten state from a polymerization reaction tank and is thereafter processed into the form of pellets, flakes, or powder.

A liquid crystal polymer in the form of pellets, flakes or powder may be subjected to the thermal treatment substantially in the state of the solid phase at a reduced pressure, under vacuum, or in an atmosphere of an inert gas such as nitrogen and helium for the purposes of increasing the molecular weight to improve the heat resistance and the like.

The temperature of the thermal treatment conducted in the state of the solid phase is not especially limited as far as a liquid crystal polymer does not melt, while the heat treatment may be conducted at 260 to 350° C., preferably at 280 to 320° C.

The liquid crystal polymer composition of the invention includes 1 to 200 parts by weight of an inorganic filler and/or an organic filler, and 0.01 to 2 parts by weight of a melamine compound as a flow modifier in addition to 100 parts by weight of a liquid crystal polymer obtained as described above.

The content of an inorganic filler and/or an organic filler is 1 to 200 parts by weight, preferably 10 to 150 parts by weight relative to 100 parts by weight of a liquid crystal polymer. When the content of an inorganic filler and/or an organic filler exceeds 200 parts by weight relative to 100 parts by weight of a liquid crystal polymer, the molding processability of a liquid crystal polymer composition is degraded and a cylinder and a mold in a molding machine become significantly worn. When the content of an inorganic filler and/or an organic filler is smaller than 1 part by weight relative to 100 parts by weight of a liquid crystal polymer, no improvement effect for the mechanical strength may be achieved.

Examples of the inorganic filler and/or the organic filler used in the invention include, for example, one or more selected from the group consisting of glass fiber, silica-alumina fiber, alumina fiber, carbon fiber, aramid fiber, potassium titanate fiber, aluminum borate fiber, wollastonite, talc, mica, graphite, calcium carbonate, dolomite, clay, glass flakes, glass beads, barium sulfate, titanium oxide, and diatom earth. Among these inorganic fillers and/or these organic fillers, glass fiber or talc is preferably used because the excellent fluidity and the excellent mechanical properties may be achieved.

The content of a melamine compound is equal to or larger than 0.01 parts by weight, preferably equal to or larger than 0.02 parts by weight, more preferably equal to or larger than 0.05 parts by weight, further preferably equal to or larger than 0.08 parts by weight, and especially preferably equal to or larger than 0.1 part by weight relative to 100 parts by weight of a liquid crystal polymer. The content of a melamine compound is equal to or smaller than 2 parts by weight, preferably equal to or smaller than 1 part by weight, more preferably equal to or smaller than 0.5 parts by weight, further preferably equal to or smaller than 0.3 parts by weight, and especially preferably smaller than 0.2 parts by weight relative to 100 parts by weight of a liquid crystal polymer. When the content of a melamine compound is smaller than 0.01 parts by weight, no improvement effect for the fluidity is achieved. When the content of a melamine compound exceeds 2 parts by weight, the molding processability of a liquid crystal polymer composition is degraded and the molding failure tends to occur.

Examples of a melamine compound used in the invention include one or more selected from the group consisting of melamine cyanurate, melamine acrylate, melamine hydrochloride, melamine sulfonate, melamine borate, and melamine pyrophosphate. Among these, melamine cyanurate is preferably used because the excellent fluidity and the excellent mechanical strength may be achieved.

In the invention, a liquid crystal polymer composition may include other additives such as, for example, a mold release improving agent such as a higher fatty acid, a higher fatty acid ester, a higher fatty acid amide, a higher fatty acid metal salt (the "higher fatty acid" as used herein refers a fatty acid having 10 to 25 carbon atoms), a polysiloxane, and a fluorine-containing resin; a coloring agent such as a dye and a pigment; an oxidation inhibitor; a thermal stabilizer; a UV absorbing agent; an antistatic agent; and a surface active agent within such a range that the effect of the invention is not impaired. In the invention, a liquid crystal polymer composition may include only one of these additives, or may include two or more thereof in combination. A liquid crystal polymer composition of the invention may include such a flow modifier other than a melamine compound as, for example, a phosphoric acid-based compound and the like, at an amount in such a range that the effect of the invention is not impaired. When a liquid crystal polymer composition of the invention includes a phosphoric acid-based compound, the content thereof is smaller than 0.2 parts by weight relative to 100 parts by weight of a liquid crystal polymer.

The total amount of other additives in a liquid crystal polymer composition is preferably 0.1 to 10 parts by weight, more preferably 0.5 to 5 parts by weight relative to 100 parts by weight of a liquid crystal polymer. When the total amount of other additives is equal to or smaller than 10 parts by weight relative to 100 parts by weight of a liquid crystal polymer, the molding processability of a liquid crystal polymer is not degraded and the thermal stability is ensured. When the total amount of other additives is smaller than 0.1 parts by weight, no function of additives may be realized.

In the molding of a liquid crystal polymer composition of the invention, an additive achieving an outer lubricant effect such as a higher fatty acid, a higher fatty acid ester, a higher fatty acid metal salt and a fluorocarbon-based surface active agent may in advance be adhered to the surface of pellets of a liquid crystal polymer.

A further resin component may be added to a liquid crystal polymer composition of the invention. Examples of the further resin component include, for example, a polyamide, a polyester, a polyacetal, a polyphenyleneether and a modified product thereof, a thermoplastic resin such as a polysulfone, a polyethersulfone, a polyetherimide, and a polyamideimide, and a thermosetting resin such as a phenol resin, an epoxy resin, and a polyimide resin. Each of further resin components may be contained alone, or two or more thereof may be contained in combination. When a liquid crystal polymer composition includes a further resin component, the content of the further resin component is not especially limited. However, in one typical example, the total amount of a further resin component is usually 0.1 to 100 parts by weight, especially 0.1 to 80 parts by weight relative to 100 parts by weight of a liquid crystal polymer.

An inorganic filler and/or an organic filler, a melamine compound, other additives and a further resin component may be added to a liquid crystal polymer, and these components are melted and kneaded with each other at a temperature between that in the vicinity of the crystal melting temperature of the liquid crystal polymer and the crystal melting temperature+20° C. using a Bunbury mixer, a kneader, a single-screw or a twin-screw extruder or the like, and the liquid crystal polymer composition may thereby be produced.

A liquid crystal polymer composition of the invention produced as described above may be processed into an injection-molded article, a film, a sheet, a non-woven cloth, and the like using a publicly known molding method in which an injection-molding machine, an extruder or the like is used. These molded articles are composed of a liquid crystal polymer of the invention, that is, may be obtained by molding a liquid crystal polymer composition of the invention.

A liquid crystal polymer composition of the invention is excellent in the fluidity. Therefore, the liquid crystal polymer composition may be preferably used as a molding resin for a molded article to which the downsizing and the reduction of the thickness are demanded.

The invention also provides a process for improving the fluidity of a liquid crystal polymer, in which 1 to 200 parts by weight of an inorganic filler and/or an organic filler and 0.01 to 2 parts by weight of a melamine compound as a flow modifier, relative to 100 parts by weight of the liquid crystal polymer are used.

The liquid crystal polymer, the inorganic filler and/or the organic filler, and the melamine compound as listed above may be used as those for the process, respectively. As to the use amounts of these components, each component may be used at an amount within the above-mentioned range.

An inorganic filler and/or an organic filler, and a melamine compound together with arbitrary additives, a further resin component, and the like are added to a liquid crystal polymer, and these components may be melted and kneaded with each other at a temperature between that in the vicinity of the crystal melting temperature of the liquid crystal polymer and the crystal melting temperature+20° C. using a Bunbury mixer, a kneader, a single-screw or a twin-screw extruder or the like. The resulted product may be used as a liquid crystal polymer composition.

A liquid crystal polymer composition obtained as described above is excellent in the fluidity and may therefore be processed into a molded article to which the downsizing and the reduction of the thickness are demanded, using a publicly known molding method.

The invention will be described in detail below with reference to Examples, while the present invention is not limited to Examples.

EXAMPLES (Liquid Crystal Polymer)

Synthesis Examples of the liquid crystal polymers used in Examples and Comparative Examples will be described.

Abbreviations used in Synthesis Examples represent the following compounds.

[Polymerizable Monomers Used in Synthesis of Liquid Crystal Polymer]
POB: 4-hydroxybenzoic acid
BON6: 6-hydroxy-2-naphthoic acid
HQ: hydroquinone
BP: 4,4'-dicarboxybiphenyl
TPA: terephthalic acid
NDA: 2,6-naphthalenedicarboxylic acid Synthesis Example 1 (LCP-1)

POB: 314.2 g (35% by mol), BON6: 61.2 g (5% by mol), BP: 169.4 g (14% by mol), HQ: 114.5 g (16% by mol), and TPA: 323.9 g (30% by mol) were put in a 2-L reaction container which includes a stirring apparatus equipped with a torque meter, and a distillation pipe, and a 1.03-fold amount by mol of acetic anhydride relative to the amount of the hydroxyl groups (mol) of the overall monomers was additionally put therein, to conduct deacetation polymerization under the following conditions.

The components put in the reaction container were put in a nitrogen gas atmosphere, and the temperature thereof was increased from the room temperature to 145° C. taking 1 hour and was maintained at the same temperature for 30 minutes. The temperature was increased to 350° C. taking 7.5 hours distilling the sub-generated acetic acid and the pressure was thereafter reduced to 5 mmHg taking 80 minutes. The polymerization reaction was terminated at the time point at which a predetermined torque was indicated, and the content was taken out from the reaction container to use a crusher to obtain pellets of the liquid crystal polyester resin (LCP-1). The amount of the distilled acetic acid during the polymerization presented a substantially theoretical value.

Synthesis Example 2 (LCP-2)

POB: 628.4 g (70% by mol), BON6: 24.5 g (2% by mol), HQ: 100.2 g (14% by mol), and NDA: 196.7 g (14% by mol) were put in a 2-L reaction container which includes a stirring apparatus equipped with a torque meter, and a distillation pipe, and a 1.05-fold amount by mol of acetic anhydride relative to the amount of the hydroxyl groups (mol) of the overall monomers was additionally put therein, to conduct deacetation polymerization under the following conditions.

The components put in the reaction container were put in a nitrogen gas atmosphere, and the temperature thereof was increased from the room temperature to 145° C. taking 1 hour and was maintained at the same temperature for 30 minutes. The temperature was increased to 345° C. taking 7 hours distilling the sub-generated acetic acid and the pressure was thereafter reduced to 10 mmHg taking 80 minutes. The polymerization reaction was terminated at the time point at which a predetermined torque was indicated, and the content was taken out from the reaction container to use a crusher to obtain pellets of the liquid crystal polyester resin (LCP-2). The amount of the distilled acetic acid during the polymerization presented a substantially theoretical value.

Synthesis Example 3 (LCP-3)

POB: 655.4 g (73% by mol) and BON6: 476.0 g (27% by mol) were put in a 2-L reaction container that includes a stirring apparatus equipped with a torque meter, and a distillation pipe, and a 1.01-fold amount by mol of acetic anhydride relative to the amount of the hydroxyl groups (mol) of the overall monomers was additionally put therein, to conduct the deacetation polymerization under the following conditions.

The components put in the reaction container were put in a nitrogen gas atmosphere, and the temperature thereof was increased from the room temperature to 145° C. taking 1 hour and was maintained at the same temperature for 30 minutes. The temperature was increased to 330° C. taking 7 hours distilling the sub-generated acetic acid and the pressure was thereafter reduced to 10 mmHg taking 80 minutes. The polymerization reaction was terminated at the time point at which a predetermined torque was indicated, and the content was taken out from the reaction container to use a crusher to obtain pellets of the liquid crystal polyester resin (LCP-3). The amount of the distilled acetic acid during the polymerization presented a substantially theoretical value.

Examples 1 to 3 and Comparative Examples 1 to 3

The inorganic filler and/or the organic filler, and the melamine compound were blended with 100 parts by weight of the liquid crystal polymer obtained in each of Synthesis Examples 1 to 3 at the weight ratios listed in Table 1, and the components were melted and kneaded with each other in a twin-screw extruder (The Japan Steel Works Ltd., TEX-30) to be pelletized, and the liquid crystal polymer composition was thereby prepared.

The inorganic filler and/or the organic filler, and the melamine compound as follows were used as those used in the above, respectively.
(Glass Fiber)
PF20E from Nitto Boseki Co., Ltd. (the average fiber length: 24 μm)
(Talc)
NK-64 from Fuji Talc Industries Co., Ltd. (the average particle diameter: 19.0 μm, the water content: 0.50% by weight)
(Melamine Compound)
Melaminecyanurate from Nissan Chemical Industries, Ltd.

For the resulted pellets of the liquid crystal polymer composition, the melt viscosity, the deflection temperature under a load, the tensile strength, the bending strength, the bending elastic modulus, the Izod impact strength, and the fluidity (the flow length) were measured according to the following methods. The results are shown in Table 1.
(Melt Viscosity)

The melt viscosity was measured at the temperature for viscosity measurement listed in Table 1 using a capillary of 1.0 mmϕ×10 mm and using a melt viscosity measuring apparatus (Capilograph 1D from Toyo Seiki Co., Ltd.).
(Deflection Temperature Under Load)

A strip-like test piece (having a length of 127 mm×a width of 12.7 mm×a thickness of 3.2 mm) was formed using an injection molding machine (UH1000-110 from Nissei Plastic Industrial Co., Ltd.) and the temperature at which a predetermined amount of deflection (0.254 mm) was achieved was measured using the strip-like test piece with a load of 1.82 MPa and at a temperature increase rate of 2° C./min according to ASTM D648.
(Tensile Strength)

An ASTM No. 4 dumbbell test piece was produced by conducting injection molding using an injection molding machine (UH1000-110 from Nissei Plastic Industrial Co., Ltd.) at a cylinder temperature of the crystal melting temperature+20 to 40° C. and at the mold temperature of 70° C. The tensile strength thereof was measured according to ASTM D638 using INSTRON 5567 (a universal testing machine from Instron Japan Co., Ltd.).
(Bending Strength and Bending Elastic Modulus)

A strip-like test piece (having a length of 127 mm×a width of 12.7 mm×a thickness of 3.2 mm) was produced under the same conditions as those of the molded piece which was used for the measurement of the deflection temperature under a load. In the bending test, measurement was conducted using a three-point bending test conducted according to ASTM D790 using INSTRON 5567 (a universal testing machine from Instron Japan Co., Ltd.).

(Izod Impact Strength)

The same test piece was used as that used for the measurement of the deflection temperature under a load, and the center of the test piece was cut perpendicularly in the length direction to obtain a strip-like test pieces each having a length of 63.5 mm, a width of 12.7 mm, and a thickness of 3.2 mm. A notch was disposed on the test piece and the measurement was conducted according to ASTM D256.

(Flow Length)

Injection molding was conducted under the molding conditions listed in Table 2 using a rectangular bar-flow mold having a longitudinal length of 50 mm, a lateral length of 1.5 mm, and a thickness of 0.2 mm, and using an injection molding machine (NEX-15-1E from Nissei Plastic Industrial Co., Ltd.), and the flow length obtained when the bar-flow mold was filled was measured.

Comparative Example 4

The pellets of the liquid crystal polymer composition were prepared similarly to Example 2 except the fact that the amount of the blended melamine compound was 2.5 parts by weight. Injection molding was attempted using the acquired pellets. However, during the advancement of the injecting apparatus toward the mold, leakage of the melted resin from the tip of the nozzle, that is, what-is-called "drooling" occurred and this resulted in a molding failure.

TABLE 1

|  | Example 1 | Comarative Example 1 | Example 2 | Comarative Example 2 | Example 3 | Comarative Example 3 |
| --- | --- | --- | --- | --- | --- | --- |
| LCP-1 | 100 | 100 | — | — | — | — |
| LCP-2 | — | — | 100 | 100 | — | — |
| LCP-3 | — | — | — | — | 100 | 100 |
| Glass fiber | 43.8 | 43.9 | 42.9 | 42.9 | 69.7 | 67.8 |
| Talc | 58.5 | 58.6 | — | — | — | — |
| Melaminecyanurate | 0.19 | — | 0.16 | — | 0.14 | — |
| Melt Viscosity (Pa · s) | 20.7 | 51.7 | 18.5 | 32.1 | 39.3 | 48.0 |
| Temperature for viscosity measurement (° C.) | 350 | 350 | 350 | 350 | 320 | 320 |
| Deflection Temperature under Load (° C.) | 260 | 261 | 292 | 288 | 219 | 226 |
| Tensile Strength (MPa) | 87 | 80 | 146 | 128 | 189 | 204 |
| Bending Strength (MPa) | 117 | 109 | 195 | 204 | 235 | 240 |
| Bending Elastic Modulus (GPa) | 10 | 10 | 17 | 17 | 14 | 13 |
| Izod Impact Strength (J/m) | 35 | 31 | 67 | 73 | 163 | 119 |
| Flow Length (mm) | 29.8 | 22.3 | 32.3 | 22.6 | 16.3 | 12.4 |

*The value of the melt viscosity is a measured value at a shear velocity of 1,000 s$^{-1}$.

TABLE 2

| Molding machine | NEX-15-1E from Nissei Plastic Industrial Co., Ltd. |
| --- | --- |
| Temperature of cylinder | 350-350-280 |
| Temperature of mold | 80 |
| Injection speed | 300 mm/sec |
| Pressure keeping | 30 MPa |
| Injection time | 2 sec |
| Cooling time | 5 sec |
| Screw rotation speed | 150 rpm |
| Screw back pressure | 5 MPa |

It can be understood that, as shown in Table 1, the liquid crystal polymer compositions of Examples 1 to 3 each including a small amount of the melamine compound had improved fluidity without degrading the mechanical strength, compared to the liquid crystal polymer compositions of Comparative Examples 1 to 3 respectively corresponding thereto and each including no melamine composition.

The invention claimed is:

1. A liquid crystal polymer composition comprising:
   100 parts by weight of a liquid crystal polymer, wherein the liquid crystal polymer is a liquid crystal polyester resin;
   1 to 200 parts by weight of an inorganic filler and/or an organic filler; and
   0.01 to 2 parts by weight of a melamine compound as a flow modifier.

2. The liquid crystal polymer composition according to claim 1, wherein
   the liquid crystal polymer is a liquid crystal polyester resin comprising repeating units represented by formulae (I) and (II):

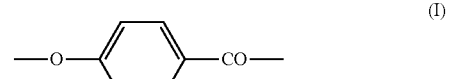
(I)

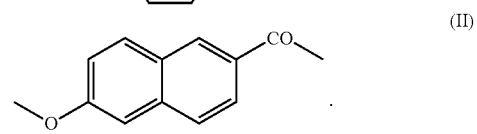
(II)

3. The liquid crystal polymer composition according to claim 1, wherein the liquid crystal polymer is a wholly aromatic liquid crystal polyester resin composed of repeating units represented by formulae (I) and (II).

4. The liquid crystal polymer composition according to claim 1, wherein the liquid crystal polymer is a wholly aromatic liquid crystal polyester resin composed of repeating units represented by formulae (I) to (IV):

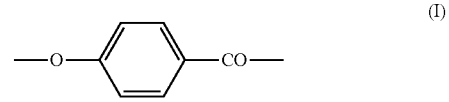
(I)

-continued

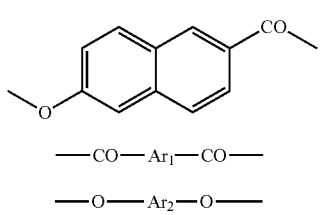
(II)

—CO—Ar₁—CO— (III)

—O—Ar₂—O— (IV)

wherein
Ar₁ and Ar₂ each represent a divalent aromatic group.

5. The liquid crystal polymer composition according to claim 4, wherein
Ar₁ and Ar₂ are one or more aromatic groups selected independently from each other, from a group consisting of aromatic groups represented by formulae (1) to (4):

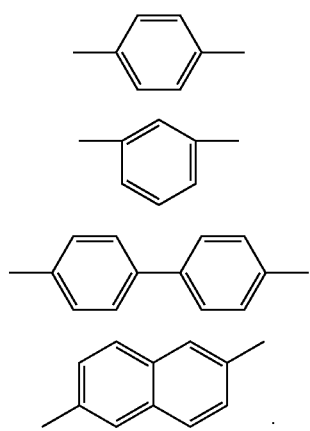

6. The liquid crystal polymer composition according to claim 4, wherein Ar₁ is an aromatic group represented by formulae (1) and/or (4), and Ar₂ is an aromatic group represented by formulae (1) and/or (3).

7. The liquid crystal polymer composition according to claim 4, wherein Ar₁ is an aromatic group represented by formula (1), and Ar₂ is an aromatic group represented by formulae (1) and (3).

8. The liquid crystal polymer composition according to claim 4, wherein Ar₁ is an aromatic group represented by formula (4), and Ar₂ is an aromatic group represented by formula (1).

9. The liquid crystal polymer composition according to claim 1, wherein the inorganic filler and/or the organic filler are/is one or more compounds selected from a group consisting of glass fiber, silica-alumina fiber, alumina fiber, carbon fiber, aramid fiber, potassium titanate fiber, aluminum borate fiber, wollastonite, talc, mica, graphite, calcium carbonate, dolomite, clay, glass flakes, glass beads, barium sulfate, titanium oxide, and diatom earth.

10. The liquid crystal polymer composition according to claim 1, wherein the inorganic filler and/or the organic filler are/is glass fiber or talc.

11. The liquid crystal polymer composition according to claim 1, wherein the melamine compound is one or more compounds selected from a group consisting of melamine cyanurate, melamine acrylate, melamine hydrochloride, melamine sulfonate, melamine borate, and melamine pyrophosphate.

12. The liquid crystal polymer composition according to claim 1, wherein the melamine compound is melamine cyanurate.

13. A molded article composed of the liquid crystal polymer composition according to claim 1.

* * * * *